(12) United States Patent
Ho et al.

(10) Patent No.: US 6,470,423 B1
(45) Date of Patent: Oct. 22, 2002

(54) MANAGING PARTITIONED CACHE

(75) Inventors: Alexander C. Ho, Belmont, CA (US); Ashok Joshi, Nashua, NH (US); Gianfranco Putzolu, San Francisco, CA (US); Juan R. Loaiza, San Carlos, CA (US); Graham Wood, Belmont, CA (US); William H. Bridge, Jr., Alameda, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 10/032,243

(22) Filed: Dec. 21, 2001

Related U.S. Application Data

(63) Continuation of application No. 09/102,735, filed on Jun. 22, 1998, now Pat. No. 6,370,619.

(51) Int. Cl.[7] .................................................. G06F 12/00
(52) U.S. Cl. .................................... 711/129; 711/133
(58) Field of Search ................................. 711/129, 133

(56) References Cited

U.S. PATENT DOCUMENTS

| | | | |
|---|---|---|---|
| 4,905,141 A | * | 2/1990 | Brenza ........................ 711/129 |
| 5,434,992 A | * | 7/1995 | Mattson ........................ 711/119 |
| 5,737,750 A | * | 4/1998 | Kumar et al. ................ 711/129 |
| 6,061,763 A | * | 5/2000 | Rubin et al. ................. 711/129 |

* cited by examiner

Primary Examiner—Do Hyun Yoo
Assistant Examiner—Nasser Moazzami
(74) Attorney, Agent, or Firm—Marcel K. Bingham; Hickman Palermo Truong & Becker LLP

(57) ABSTRACT

Described herein are approaches for partitioning a buffer cache for dynamically selecting buffers in the buffer cache to store data items, such as data blocks in a DBMS. The selection is based on data access and/or usage patterns. A buffer cache includes multiple buffer pools. A buffer pool is selected from among the multiple buffer pools to store a data item. The selection of a buffer pool is based on various factors, including the likelihood that storing the data item will produce future cache hits, and properties of buffer pools that vary between the buffer pools. Properties of a buffer pool include not only how the buffer pools are organized, both logically and physically, but also how the buffer pool is managed. Examples of a buffer pool property include buffer pool size, size of a buffer in the buffer pool, and the replacement strategy used for a buffer pool (e.g. LRU).

59 Claims, 8 Drawing Sheets

MANAGING PARTITIONED CACHE

RELATED APPLICATION

This patent application is a continuation of U.S. patent application Ser. No. 09/102,735, now U.S. Pat. No. 6,370, 619, entitled "MANAGING PARTITIONED CACHE", filed by Alexander C. Ho, et al., on Jun. 22, 1998, the contents of which are herein incorporated by reference in its entirety.

FIELD OF THE INVENTION

The present invention relates to computer systems and, more specifically, to a method for partitioning a buffer cache.

BACKGROUND OF THE INVENTION

Most data processing systems include both volatile and nonvolatile memory devices. In general, volatile memory devices, such as random access memory, provide faster access times than nonvolatile memory devices, such as magnetic or optical disks. However, nonvolatile memory is generally less expensive and less susceptible to data loss.

To take advantage of the persistent nature of nonvolatile memory, an object, such as a data item in a database system, is typically stored on nonvolatile memory (e.g. in a data block on a disk) until the data item is required by a particular process of the database system. To take advantage of the speed of volatile memory, a copy of the data block that contains the data item is loaded into volatile memory when the data item is required by a particular process of the database system. Once the data block is loaded into volatile memory, the process can quickly access and make changes to the copy of the data item. At some later point in time, the copy of the updated data item is written back to the database in order to reflect the changes that were made by the process.

For example, in a database system, a section of volatile memory known as a buffer cache is generally used by processes for accessing and manipulating information contained within the database. In order for a process to access or change data that is stored in the database, a copy of the data block that contains the data item is first loaded from the database into the buffer cache. After the data block is loaded in the buffer cache the process can then quickly access and manipulate the copied data version. At some later point in time, the contents of the buffer cache is written back to the database in order to reflect any changes that were previously made to the copied data version.

Typically, the buffer cache includes multiple buffers that are shared among one or more processes that are executing on a database server. When a process executes a transaction that requires a change to a data item within a data block, that is not already present within the buffer cache, the data block that contains the data item is loaded into a buffer in the buffer cache. Any changes are then made to the data within the buffer.

Because the buffer cache contains a fixed amount of memory, a limited number of buffers are available for processing information. Often the amount of information to be processed exceeds the capacity of the buffers available to hold the information (i.e. data blocks). Once the buffer cache is full, storing new data in the buffer cache requires replacing data that already resides in the buffers within the buffer cache with the new data. In order to manage the limited number of available buffers, several replacement strategies have been developed. These replacement strategies determine which of the buffers currently residing in the buffer cache are to be overwritten with the new data (i.e. cached out).

Over the years, many different replacement strategies have been developed to increase efficiency. The most common of these strategies include replacing the least recently used (LRU) data, replacing the data that has been in the buffer the longest (First-In/First-Out, or FIFO), or replacing the newest data in the buffer (Last-In/First-Out, or LIFO). Each of these methods has both advantages and disadvantages that greatly depend on the amount of data being processed, the size of the buffer cache and the usage pattern which corresponds to how the data is being accessed.

Most database servers employ a single buffer cache. A drawback with using a single buffer cache is that only a single replacement strategy can be used for the entire set of buffers within the buffer cache. Using a single replacement strategy in a database system can be very inefficient when differently sized tables are accessed using different usage patterns. This inefficiency occurs because different usage patterns and differently sized tables can require distinct replacement strategies for efficient caching.

For example, FIG. 1 depicts a database system 100 in which an order table 104, an employee table 106, and a stock table 108 are accessed through a single buffer cache 102. Order table 104 contains a record of each order and contains more data blocks than can fit within the buffers of buffer cache 102 at any one time. Order records are constantly being added to the end of order table 104. Therefore, it would be efficient to only keep in the buffer cache 102 the buffers that contain information from data blocks that are currently at the end of the order table 104.

Conversely, stock table 108 comprises all of the stock items for sale and is small enough to fit within the number of buffers contained in buffer cache 102. As stock items are retrieved on a frequent basis, it would be efficient to keep all data blocks of the entire stock table 108 within the buffers of buffer cache 102 at all times.

On the other hand, employee table 106 contains the address of each employee and is referenced very infrequently. Once an employee record is accessed it is normally not accessed again for a very long period of time. Therefore, it would be efficient to swap-out these buffers soon after an access completes so that another operation can use the buffer.

Because the tables of database system 100 have different caching requirements, a single replacement scheme cannot efficiently manage the replacement requirements associated with each of the tables. However, because data base system 100 contains only a single buffer cache 102, the single replacement strategy for the buffer pool must be applied to all tables within database system 100 regardless of their size and usage patterns.

To address the inefficiencies associated with a single buffer cache, database servers can divide the buffer cache into multiple sub-cache areas. By using multiple sub-cache areas, each sub-cache can maintain its own individual replacement strategy that may differ from the replacement strategies associated with other sub-cache areas. Therefore, different replacement strategies can be used for different table based upon the memory disk address of the data blocks that are associated with a particular table. However, by using multiple sub-cache areas, data blocks, based on their nonvolatile memory disk address, are statically assigned to a particular sub-cache area and therefore can only be cached into buffers that are located within the particular sub-cache area.

Therefore, in such a database system, although multiple sub-cache areas provide for individual replacement strategies, a particular replacement strategy must be used for all data blocks that are assigned to a particular sub-cache area. This mapping restricts a particular table to a particular replacement strategy based on where its associated data blocks are located on disk. Thus, because data blocks are statically assigned to a specific sub-cache area based on its nonvolatile memory disk address, a particular sub-cache area or specific replacement strategy cannot be dynamically chosen for a particular table based on its access or usage pattern.

Therefore, based on the foregoing, it is clearly desirable to provide a mechanism for dynamically mapping data blocks to replacement strategies based on the associated table's access or usage patterns.

SUMMARY OF THE INVENTION

Provided herein are approaches for partitioning a buffer cache for dynamically selecting buffers in the buffer cache to store data items, such as data blocks in a database system. The selection is based on data access and/or usage patterns. According to an aspect of the present invention, a buffer cache includes multiple buffer pools. A buffer pool is selected from among the multiple buffer pools to store a data item. The selection of a buffer pool is based on at least several factors. These include the likelihood that storing the data item will produce future cache hits, and properties of buffer pools that vary between the buffer pools. Properties of a buffer pool include not only how the buffers are organized within a buffer pool, logically and physically, but also how the buffer pool is managed. Examples of a buffer pool property include buffer pool size (e.g. number of buffer pools), size of a buffer in the buffer pool, and the replacement strategy used for a buffer pool (e.g. LRU algorithm).

According to another aspect of the present invention a hint parameter, which identifies a particular reason as to why a particular object associated with the requested data item is being accessed, is used to select the particular buffer pool for storing the requested data item.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus are described for partitioning a buffer cache for dynamically mapping data blocks with a particular replacement strategy based on the associated table's access and/or usage patterns. In the following description, for the purposes of explanation, numerous specific details are set forth in order to provide a thorough understanding of the present invention. It will be apparent, however, to one skilled in the art that the present invention may be practiced without these specific details. In other instances, well known structures and devices are shown in block diagram form in order to avoid unnecessarily obscuring the present invention.

Hardware Overview

Figure 1:
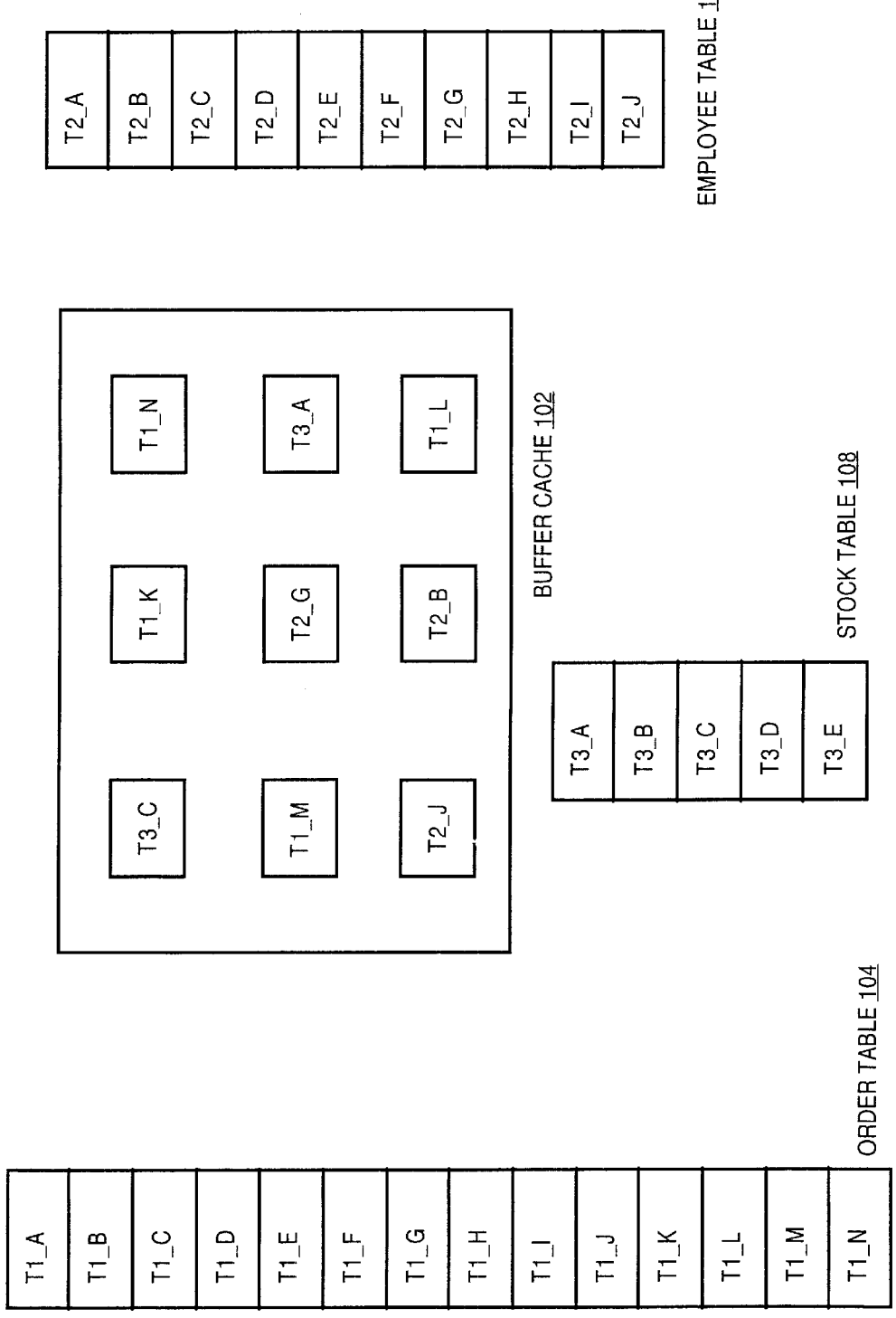
FIG. 1 is a block diagram that illustrates a buffer cache that supports a conventional caching mechanism in a typical database system.
Figure 2:
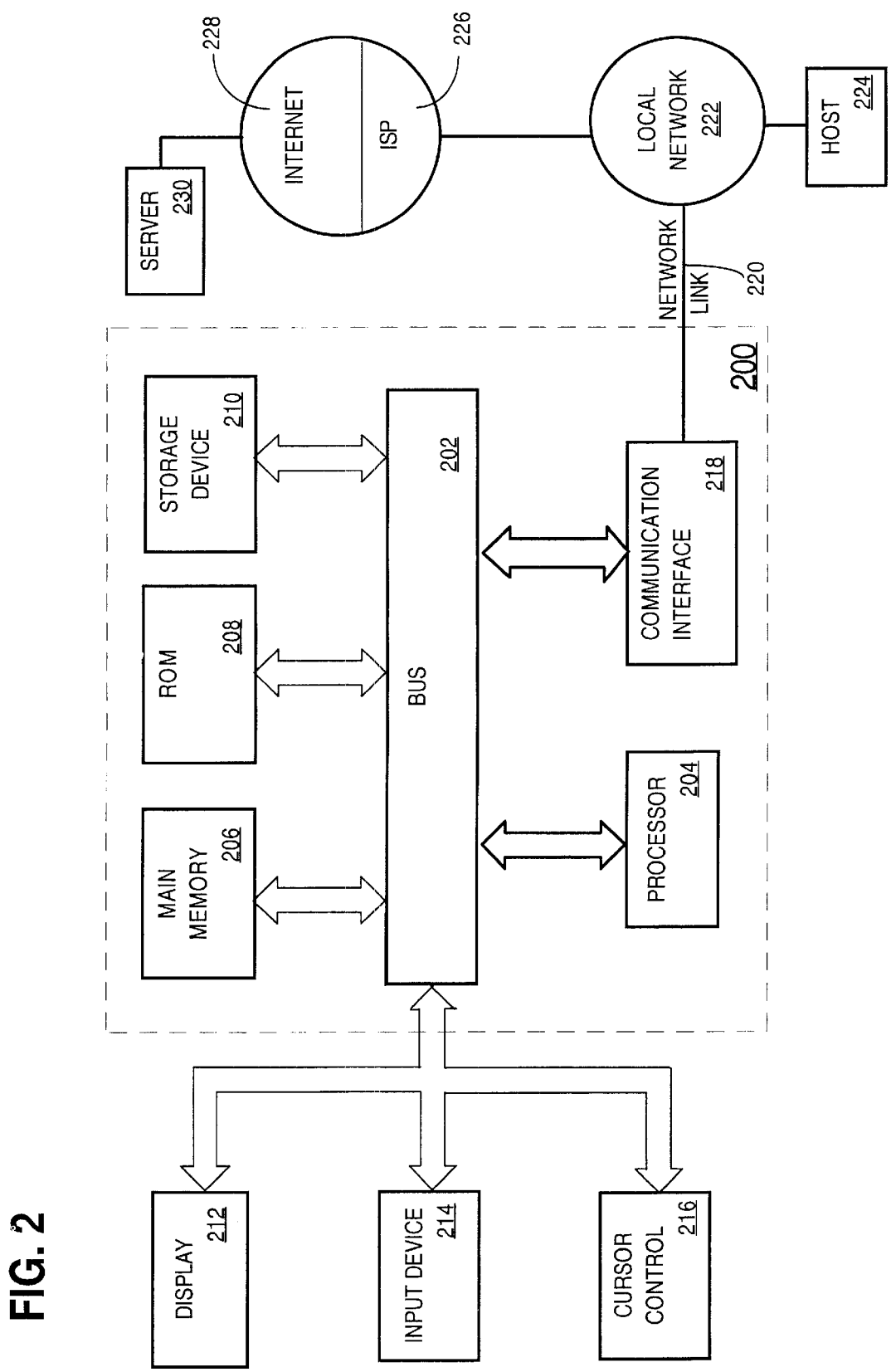
FIG. 2 is a block diagram illustrating a computer system on which an embodiment of the present invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for managing a buffer cache. According to one embodiment of the invention, the managing of the buffer cache is provided by computer system 200 in response to processor 204 executing sequences of instructions contained in main memory 206. Such instructions may be read into main memory 206 from another computer-readable medium, such as storage device 210. However, the computer-readable medium is not limited to devices such as storage device 210. For example, the computer-readable medium may include a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Execution of the sequences of instructions contained in main memory 206 causes processor 204 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application provides for the managing of the buffer cache as described herein.

The received code may be executed by processor 204 as it is received, and/or stored in storage device 210, or other non-volatile storage for later execution. In this manner, computer system 200 may obtain application code in the form of a carrier wave.

Partitioned Cache Overview

A partitioned buffer cache provides a mechanism that can be used to increase a buffer cache hit ratio and to provide for an increase in the scalability and throughput of a computer system. In certain embodiments of the present invention, a buffer cache is partitioned into multiple buffer pools. Each buffer pool can contain a different number of buffers and may employ a different replacement technique for replacing its buffers. When a data block that contains a data item is copied into a buffer from disk, the data block is dynamically assigned to a buffer in a particular buffer pool based on the reason that the data item is being accessed. Thus, there is no static mapping between a data block's location on disk and the buffer in which data block can be stored. This allows a different caching algorithm to be used for a particular data item not only based on the disk location of data block containing the data item, but also on the reason that the data item is being accessed. The dynamic buffer pool assignment employs an orthogonal search method that allows the buffer that contains the data block to be located independent of the buffer pool in which the data block is stored. The cache partitioning techniques and orthogonal search method are described in greater detail below.

It should be noted that the present invention can be practiced on any system that manages a shared buffer cache and is therefore not limited to a particular type of system. An example of one type of system in which the invention can be practiced is a database system. For explanation purposes only, certain details of the present invention will be described using a database system.

Partitioning a Buffer Cache

Figure 3:
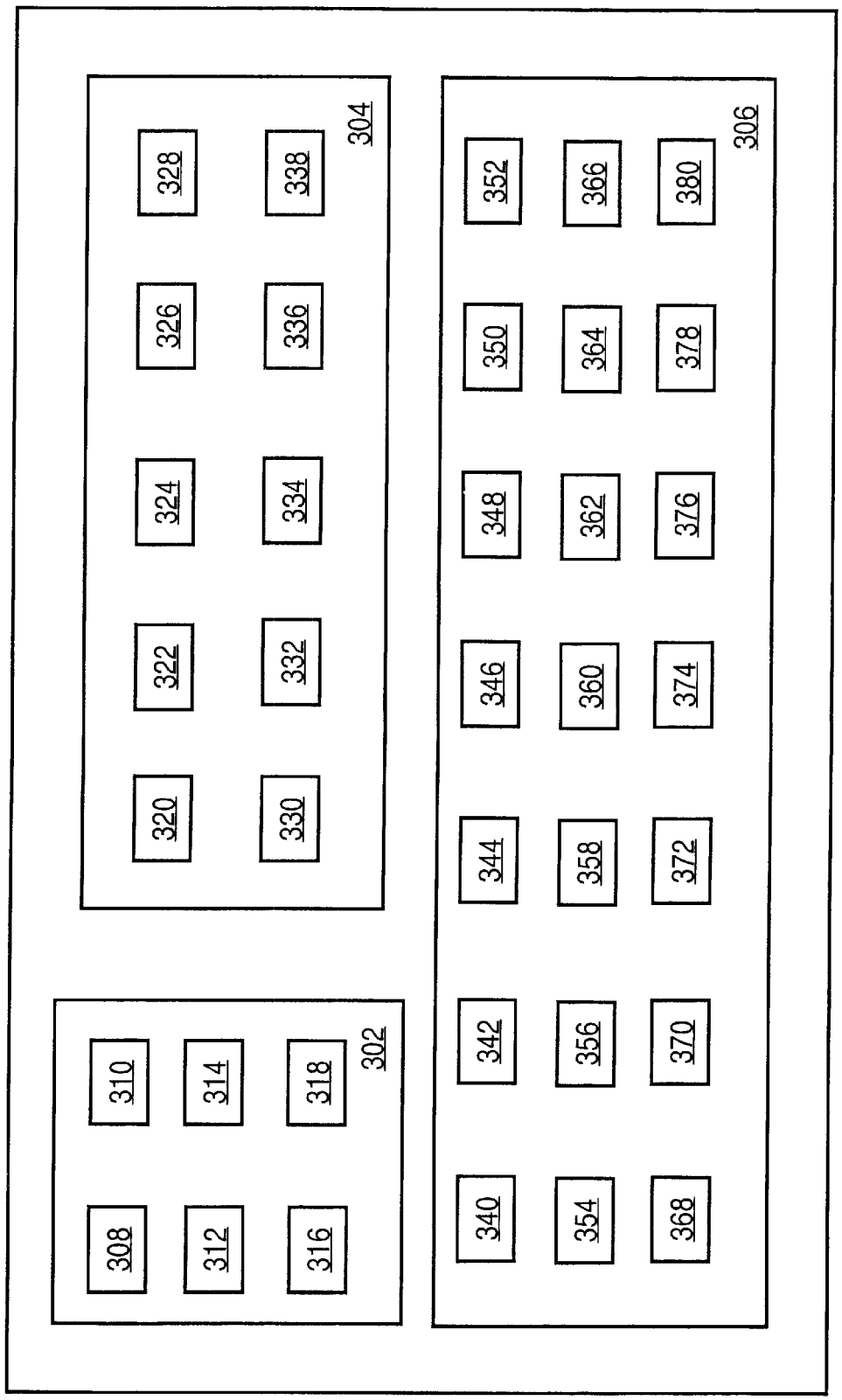
FIG. 3 is a block diagram depicting a buffer cache that is partitioned into multiple buffer pools in accordance with the present invention.

As previously stated, by partitioning a buffer cache into multiple buffer pools, a different caching algorithm may be used for caching by each buffer pool. In addition, by partitioning the buffer cache into different buffer pool sizes (i.e. a different number of buffers in each buffer pool), the buffer pools can be tuned to achieve different behavior characteristics. For example, FIG. 3 depicts a buffer cache 300 that is partitioned into three buffer pools 302, 304 and 306, according to an embodiment of the present invention. By partitioning the buffer cache 300 into multiple buffer pools, a different replacement technique may be used on each buffer pool. For example, a LRU replacement technique may be used on buffer pool 302, a FIFO replacement technique may be used on buffer pool 304 and a LIFO replacement technique may be used on buffer pool 306.

In addition to providing for different replacement techniques, the multiple buffer pools may contain a different number of buffers. For example, as depicted in FIG. 3, buffer pool 302 contains six buffers (308–318), buffer pool 304 contains ten buffers (320–338), and buffer pool 306 contains twenty-one buffers (340–380).

Buffer Pool Latches

When a process requires a data block to be cached into a particular buffer pool, the process must first acquire a latch in the corresponding buffer pool. At any given time, a particular latch may be acquired by at most one process. If a latch is not available in a particular buffer pool, a process may be required to wait until a latch becomes available. Therefore, in certain embodiments of the invention, the buffer pools contain multiple latches which provide for greater buffer replacement concurrency. Each buffer latch is linked to a particular number of buffers that may vary from latch to latch.

Figure 4:
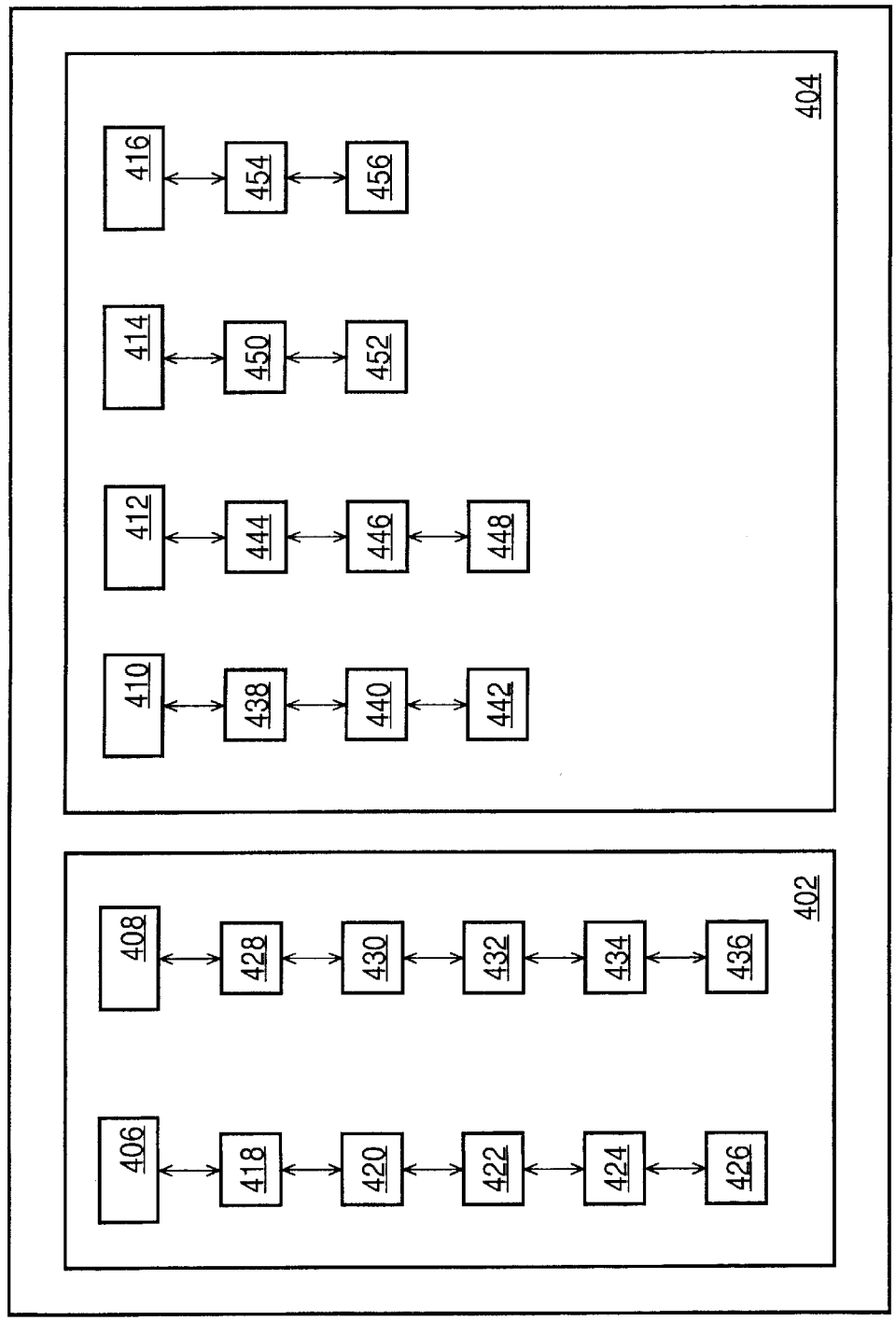
FIG. 4 is a block diagram depicting another buffer cache that is partitioned into multiple buffer pools in accordance with the present invention.

FIG. 4, depicts an example of a buffer cache 400 that is partitioned into two buffer pools 402 and 404. Buffer pool 402 contains two latches 406 and 408 and buffer pool 404 contains four latches 410, 412, 414 and 416. In this example, latch 406 is linked to a buffer chain containing buffers 418–426 and latch 408 is linked to a buffer chain containing buffers 428–436. Latches 410, 412, 414 and 416 are respectively linked to buffer chains containing buffers 438–442, 444–448, 450–452 and 454–456. As previously described, buffer pools 402 and 404 may employ different replacement techniques.

It should be noted that the latches 406–416 are depicted as being contained within the buffer pools 402 and 404 for explanation purposes only. This is also true of other figures in which buffer pool examples are depicted as having latches contain within them.

When a process requires a buffer, it first determines which particular buffer pool should be used for caching the data block and then attempts to acquire a latch that is linked to that particular buffer pool. If a latch is available, the process acquires the latch and, using the replacement technique that is employed by the buffer pool, selects the buffer into which the data block is to be stored. The data block is then stored in the selected buffer. For example, if PROCESS_A requires a DATA BLOCK_1 to be cached into buffer pool 402, PROCESS_A must first acquire either latch 406 or 408. After PROCESS_A acquires a latch (i.e. either latch 406 or 408) using the replacement technique that is employed by buffer pool 402, a buffer that is contained in the buffer chain that is linked to the corresponding latch is selected and the data block is cached into the selected buffer.

For example, assume that latch 406 is obtained, that buffer pool 402 employs a LRU replacement technique, and that buffer 426 is currently the least recently used buffer linked to latch 406. In this example, the data contained in buffer 426 is replaced by the data contained in DATA BLOCK_1.

In certain embodiments, buffers are distributed evenly (i.e. as evenly as possible) across each of the latches that are contained in a particular buffer pool. For example, in buffer pool 402, the ten buffers (418–436) are divided evenly among latches 406 and 408. By distributing the buffers evenly among the latches, a system can take a greater advantage of the replacement technique that is being employed by a particular buffer pool. For example, if latch 406 was linked to 8 buffers (buffers 418–432) and latch 408 was linked to only 2 buffer (buffers 434–436), if both latches had the same chance of being chosen, the buffers linked to latch 408 would be replaced at a greater rate than the buffers linked to latch 406.

Because a latch must be obtained before a data block can be copied into a buffer, the behavior of a particular buffer pool can be influenced by the ratio of the number of buffers to the number of latches that are contained in the particular buffer pool. The higher the ratio of latches to buffers the greater the concurrency that can be obtained for a particular buffer pool.

In certain embodiments, a user can define the number of latches that are contained in a particular buffer pool. In one embodiment, the user chooses the number of latches for a particular buffer pool based on the number of processes that will access the buffer pool concurrently. For example, if the buffers in a particular buffer pool are only accessed by a single process, then it would be efficient for the buffer pool to only contain a single latch. However, if more than one process has concurrent access to the buffer pool, it is typically more efficient to use a multiple number of latches.

Locating Data Items in Buffer Pools

Before a data item is copied into a buffer in a buffer pool, the buffer cache is searched to determine whether the data item already exists within a buffer of the buffer cache. Because the data block that contains the data item may potentially be copied into any buffer in any buffer pool, a search of the entire buffer cache may be required to determine if the data item already exists in a buffer pool. Therefore, in certain embodiments of the invention, hash chains are used to link buffers independent of the buffer pool in which the buffers are stored. These hash chains provide an orthogonal method for locating a data block that is stored in a buffer pool within the buffer cache.

Figure 5:
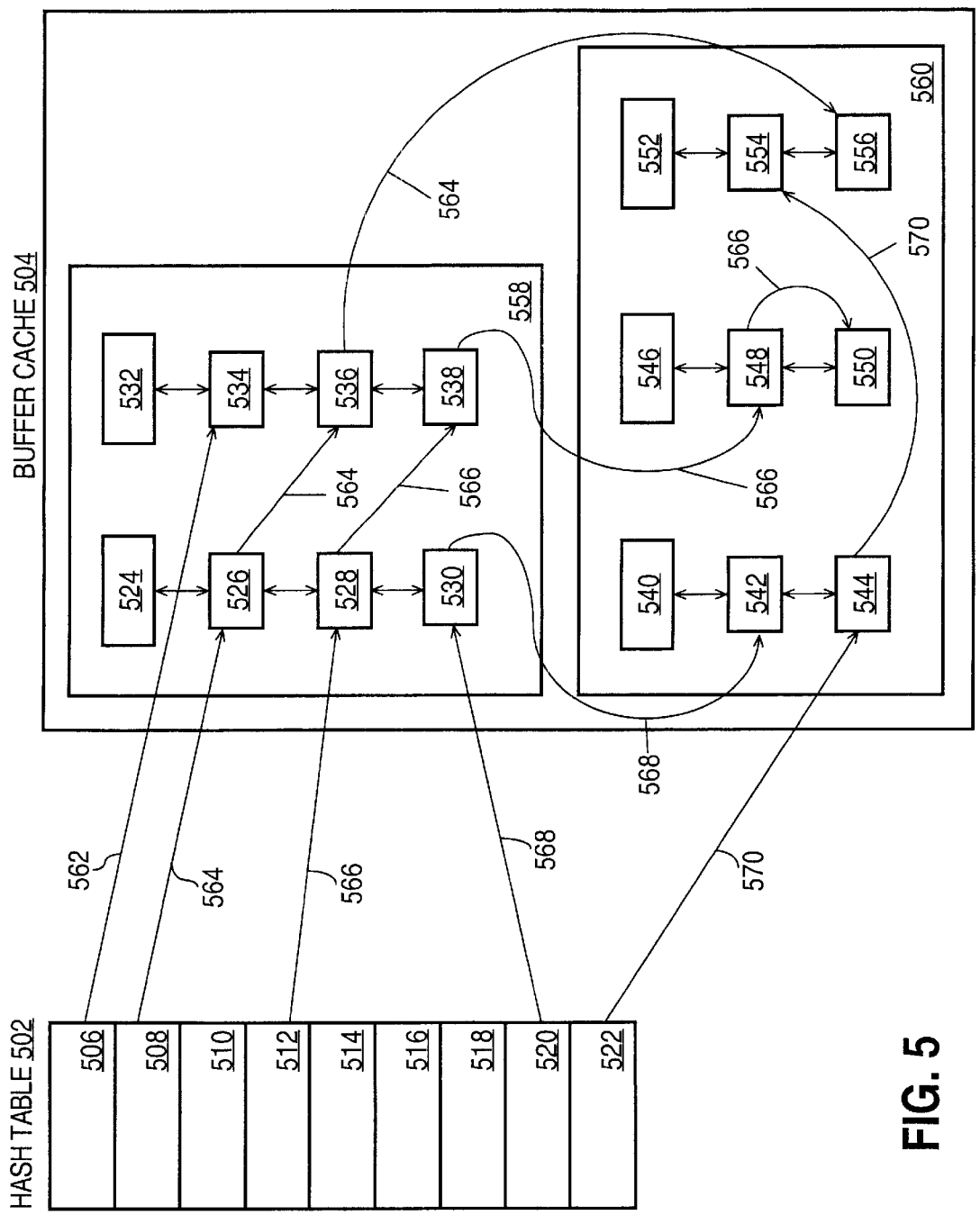
FIG. 5 is a block diagram depicting a hash table and a buffer cache that is partitioned into multiple buffer pools in accordance with the present invention.

For example, FIG. 5 depicts a hash table 502 that contains hash buckets 506–522 and hash chains 562–570. A buffer cache 504 is partitioned into two buffer pools 558 and 560. Buffer pool 558 contains latches 524 and 532, and buffer pool 560 contains latches 540, 546 and 552. As depicted, each latch is linked to a chain of buffers, as previously illustrated in FIG. 4.

Whenever a data block is copied into a buffer, the buffer is hashed into a particular hash bucket and linked to the particular hash bucket's hash chain. In one embodiment, the disk address of the data block is used to determine which hash chain the buffer will be linked into. By searching the hash chain of a particular hash bucket, it can be determined, independent of the buffer pools, whether or not a particular data block exists within a buffer of the buffer cache.

For example, hash chain 564 links hash bucket 508 to buffer 526, buffer 526 to buffer 536, and buffer 536 to buffer 556. As depicted, hash chain 564 links multiple buffers (526, 536, 556) independent of the buffer pool in which they are stored. Therefore, by hashing a data block into a particular bucket of the hash table 502 and searching the hash chain associated with the hash bucket, it can be determined whether or not a data item already exists within a buffer in buffer cache 504, independent of the buffer pools. As depicted, the buffers that are linked in a particular hash chain may span multiple buffer pools.

In certain embodiments of the invention, a buffer pool ID is stored in each buffer when it is stored into a particular buffer pool. The buffer pool ID in a buffer indicates the buffer pool in which the buffer is currently stored and can be used to determine the buffer pool in which a buffer is currently stored when the buffer is located through the use of a hash chain. This provides a mechanism for the mapping of data blocks to buffer pools and the mapping of buffer pools to data blocks. In certain embodiments, the buffer pool ID is stored in the header of each buffer (i.e. stored in the control block that describes the buffer).

Buffer Pool Mapping Reasons

As previously stated, when a data block that contains a data item is to be copied into a buffer from disk, the data block is dynamically assigned to a particular buffer pool based on the reason that the data item is being accessed. In certain embodiments, a "hint" is used as a basis for determining the reason that a particular data item is being accessed. A hint is data that is used as a basis for the selection of a particular buffer pool.

In one embodiment, the hint is provided by allowing the user to include a parameter in a database query syntax that specifies a particular buffer pool that is to be used. For example, the SQL language can be extended to include a parameter that specifies a specific buffer pool in which a data block containing a particular data item is to be stored.

In certain embodiments, if the data block containing the particular data item cannot be copied into a buffer in the specified buffer pool, the data block is automatically copied into a buffer that is contained in a default buffer pool. In general, the default buffer pool exists to hold items that may have been hinted for a buffer pool that does not currently exist.

In certain embodiments of the invention, an optimizer determines the reason that a particular data item is being accessed. An optimizer is a process that creates a set of instructions that specifies how a particular set of data should be accessed. In one embodiment, the optimizer parses a database query to create a query plan that includes a mapping for data blocks accessed to buffer pools.

Figure 6:
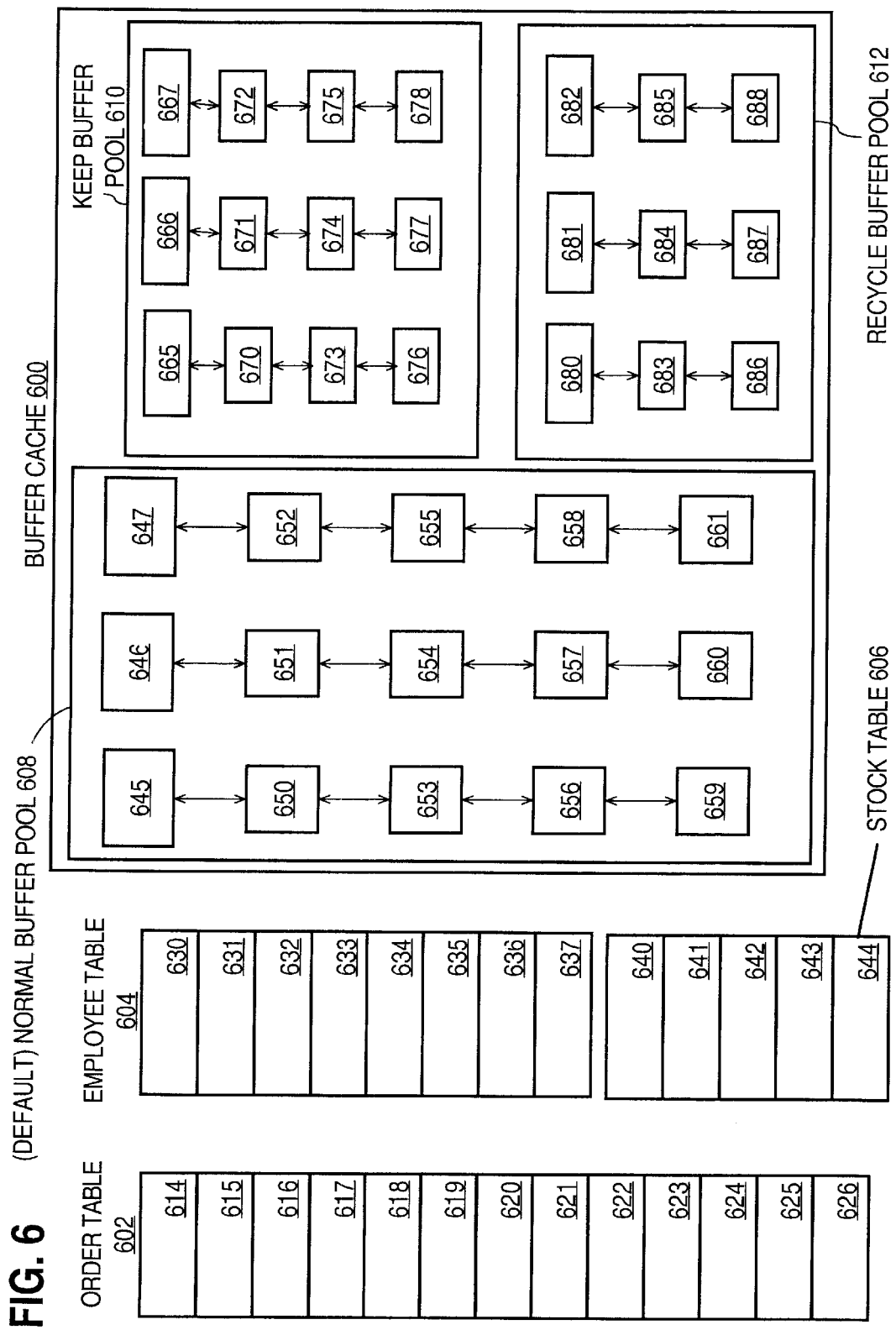
FIG. 6 is a block diagram depicting database tables and a buffer cache that is partitioned into multiple buffer pools in accordance with the present invention.

For example, FIG. 6 depicts a buffer cache 600 that is partitioned into three buffer pools, a NORMAL BUFFER POOL 608, a KEEP BUFFER POOL 610 and a RECYCLE BUFFER POOL 612, which are used to store data according to different access patterns. In this example, data blocks (650–661) containing data items that can be cached out of buffer cache 600 at a normal rate are copied into buffers in the NORMAL BUFFER POOL 608. Alternatively, data blocks (670–678) containing data items that should be retained in buffer cache 600 are copied into buffers in the KEEP BUFFER POOL 610. Conversely, data blocks (683–688) containing data items that should not be retained in buffer cache 600 are copied into buffers in the RECYCLE BUFFER POOL 612. FIG. 6 also includes an ORDER TABLE 602, an EMPLOYEE TABLE 604 and a STOCK TABLE 606, each containing a particular number of data blocks.

The number of buffers that is contained in each buffer pool may vary from system to system. However, the number of buffers that is contained in the KEEP BUFFER POOL 610 is typically at least as large as the number of data blocks that are contained in an object (i.e. STOCK TABLE 606), whose contents will be buffered within the KEEP BUFFER POOL 610. Conversely, the number of buffers that is contained in the RECYCLE BUFFER POOL 612 is typically less than the number of data blocks that is contained in an object whose contents will be buffered within the RECYCLE BUFFER POOL 612.

In this example, NORMAL BUFFER POOL 608 has been designated as the "default" buffer pool. However, any buffer pool can be designated as the "default" buffer pool. In certain embodiments, a hierarchy of "default" buffer pools is used.

If a database query is submitted requesting the name of all employees that will be eligible for retirement in the next two years, a full scan of the EMPLOYEE TABLE 604 will typically be required. Because the employee information can be obtained by scanning the EMPLOYEE TABLE 604 a single time, retaining the data blocks 630–637 in the buffer cache 600 once they have been inspected will not increase the buffer cache hit ratio. Instead, retaining the data blocks 630–637 in buffer cache 600 after they have already been inspected can actually reduce a system's throughput because other data blocks, which may be stored in buffer cache 600 for a purpose that requires them to be frequently accessed, may be unnecessarily swapped out of cache. Therefore, in this example, when the optimizer parses a data base query requesting the name of all employees that will be eligible for retirement in the next two years, the optimizer creates a plan that maps the data blocks (630–637) contained in EMPLOYEE TABLE 604 into RECYCLE BUFFER POOL 612.

Alternatively, if a database query is submitted that requests a continual update as to the number of stock items that have been sold, a nested loop through the STOCK TABLE 606 will typically be required. Because the stock information is obtained by repeatedly looping through the STOCK TABLE 606, retaining the data blocks 640–644 within buffer cache 600 can significantly increase the buffer cache hit ratio. Specifically, during the second and subsequent iterations through the stock information, the data blocks containing the stock information will already be located in buffer cache 600. Therefore, in this example, when the optimizer parses a database query requesting a continual update as to the number of stock items that have been sold, the optimizer creates a plan that maps the data blocks (640–644) contained in STOCK TABLE 606 into KEEP BUFFER POOL 610.

In certain embodiments, if the optimizer creates a plan that maps a data block into an invalid or non-configured buffer pool, the data block is automatically mapped into a buffer contained in the default buffer pool. In general, the default buffer pool exists to hold items that may have been hinted for a buffer pool that does not currently exist.

In certain embodiments, the source of a data item (e.g. the logical container in which a particular data item resides) is used as a basis for determining the reason that the data item is being accessed. For example, data blocks 614–626 of ORDER TABLE 602 may be statically mapped to NORMAL BUFFER POOL 608, data blocks 630–637 of EMPLOYEE TABLE 604 may be statically mapped to RECYCLE BUFFER POOL 612, and data blocks 640–644 of STOCK TABLE 604 may be statically mapped to KEEP BUFFER POOL 610.

In certain embodiments, if a data block is statically mapped to an invalid buffer pool, the data block is automatically mapped to a buffer contained in a default buffer pool. For example, if the data block is mapped to a buffer pool that does not exist, the data block is automatically mapped into the default buffer pool.

In certain embodiments, a particular usage is used as a basis for determining the reason that a data item is being accessed. The particular usage is defined by the objective of the process that is accessing the data item (i.e. recovery process, backup process, etc.). For example, if a recovery process is executed to recover the data blocks contain in ORDER TABLE 602, the data blocks 614–626 may be assigned to NORMAL BUFFER POOL 608 for the purpose of recovery. Alternatively, if a backup process is executed to backup the data blocks contained in ORDER TABLE 602, the data blocks 614–626 may be assigned to RECYCLE BUFFER POOL 612 for the purpose of backup. In certain embodiments, if a data block is assigned to an invalid buffer pool based on its particular usage, the data block is automatically assigned to a buffer contained in a default buffer pool.

Although the above examples illustrate separate techniques for determining the reason that a data item is being accessed, in certain embodiments, these techniques are used in combination with each other in defining a particular reason that a data item is being accessed. For example, the disk location of the block that contains the data item in combination with a particular usage (i.e. a backup process), can be used as a basis for determining the reason that a data item is being accessed (and consequently the buffer pool that will be used to buffer the data block). Thus, while executing a backup process, data blocks 614–626 of ORDER TABLE 602 may be assigned to NORMAL BUFFER POOL 608 while data blocks 630–637 of EMPLOYEE TABLE 604 may be assigned to RECYCLE BUFFER POOL 612.

Additionally, because data blocks are not statically mapped to particular buffer pools, the data blocks containing data items of a particular object (i.e. ORDER TABLE 602) can be can be located in buffers that belong to different buffer pools. For example, during a backup process, data blocks 614–626 of ORDER TABLE 602 may be assigned to NORMAL BUFFER POOL 608. If during the backup process another process requires information contained in ORDER TABLE 602, depending on the reason that ORDER TABLE 602 is being accessed, some of data blocks 614–626 may be copied into buffers that are contained in either the KEEP BUFFER POOL 610 or RECYCLE BUFFER POOL 612.

In addition, in certain embodiments, these methods are used in combination with each other to create a hierarchical technique for selecting a buffer pool based upon the reason that a data item is being accessed. For example, if a hint parameter is included in an SQL statement, then it is used as a basis for determining the particular reason that a data item is being accessed. However, if a hint parameter is not included, then the optimizer determines the reason that a particular data item is being accessed based upon the nature of the operation that requires access to the data item. In certain embodiments, a data block containing a particular data item is mapped to the default buffer pool if the reason that the particular data item is being accessed cannot be determined or if the data block is mapped to an invalid buffer pool.

Dynamically Resizing Buffer Pools

Figure 7A:
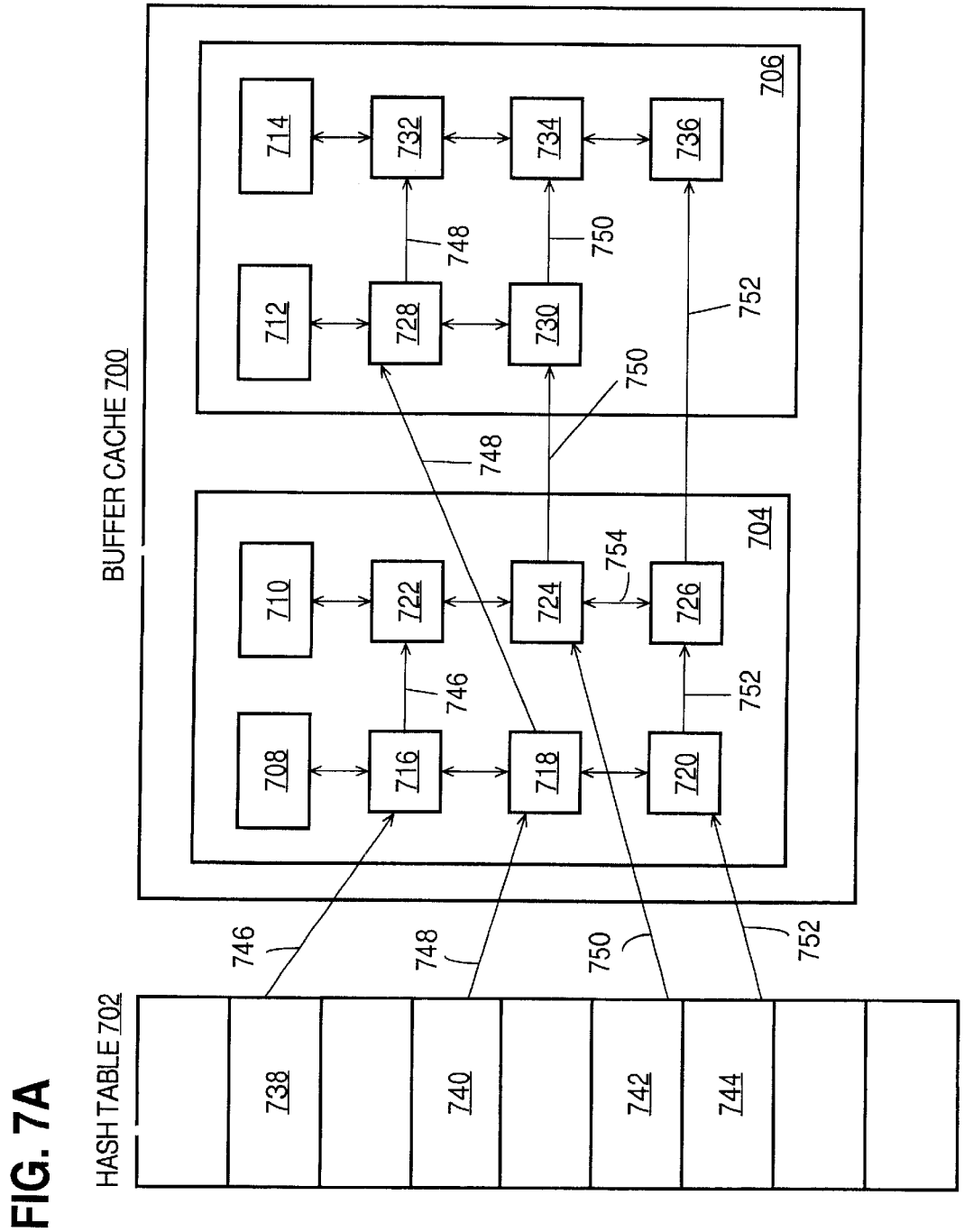
FIG. 7A is a block diagram depicting a method for resizing buffer pools in accordance with the present invention.

In certain embodiments of the invention, the buffer pools can be dynamically resized by moving buffers from one buffer pool to another buffer pool. Because data blocks are not statically assigned to a particular buffer pool, a buffer can be reassigned to a different buffer pool without losing any information that is contained in the buffer. For example, FIG. 7A and FIG. 7B respectively depicts a Buffer Cache 700 before and after buffer pools 704 and 706 are resized. As depicted in FIG. 7A, prior to resizing the buffer pools 704 and 706, buffer 726 is linked to buffer 724 by link 754. In addition, hash chain 752 links hash bucket 744 to buffer 720, buffer 720 to buffer 726, and buffer 726 to buffer 736. As previously described, the hash chains 746, 748, 750 and 752 provide an orthogonal search method that can be used to locate a particular data block, independent of the buffer pool in which the data block is stored.

Figure 7B:
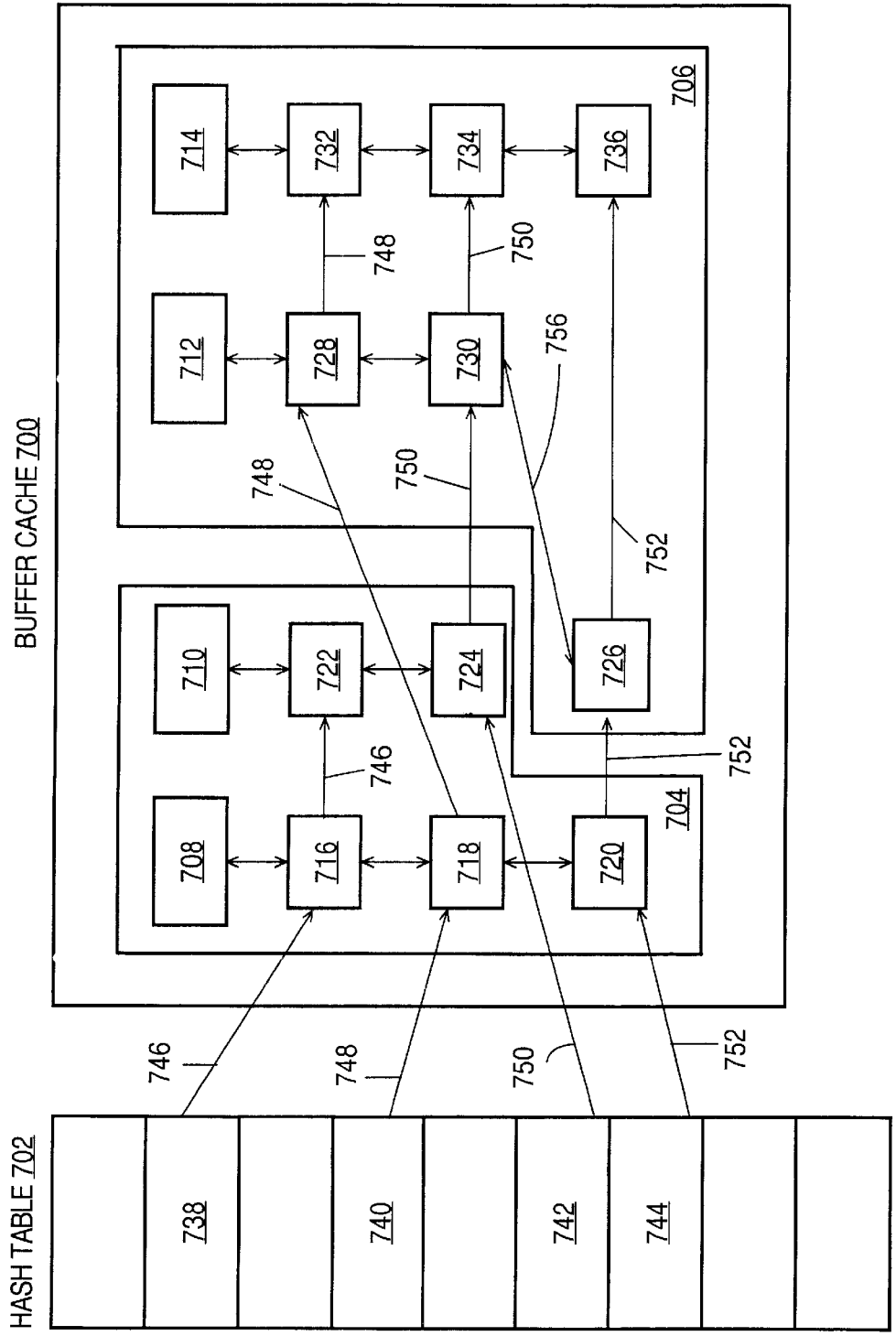
FIG. 7B is another block diagram depicting the method for resizing buffer pools in accordance with the present invention.

As depicted in FIG. 7B, in resizing buffer pools 704 and 706, buffer 726 is unlinked from buffer 724 and linked to buffer 730 using link 756. Because the buffers are not statically assigned to a particular buffer pool, buffer 726 does not need to be copied from buffer pool 704 into buffer pool 706. Instead, by unlinking buffer 726 from buffer 724 and re-linking it to buffer 730, the boundaries of buffer pools 704 and 706 are automatically redrawn, thus allowing buffer 726 to be reassigned to a different buffer pool without losing any buffer information.

In systems that use buffer pool IDs, the buffer pool ID is updated to reflect the moving of the buffer from one buffer pool to another. For this example, the buffer pool ID for buffer 726 is updated from 704 to 706 to reflect its move.

Dynamically Allocating Buffer Pools

In certain embodiments of the invention, buffer pools can be dynamically allocated as needed. For example, a large number of buffer pools that contain no buffers (i.e. empty buffer pools) can be allocated at startup. In certain embodiments, each empty buffer pool is associated with a particular number of latches. Thereafter, when a new buffer pool is needed, a particular number of buffers can be dynamically linked into the new buffer pool. In an alternative embodiment, a set of buffer pools which contain no latches or buffers, along with a set of unassigned latches, are created at startup. When a new buffer pool is needed, a particular number of buffers and latches are dynamically assigned to the new buffer pool.

CONCLUSION

As described, the partitioned buffer cache provides a mechanism that can be used to increase a buffer cache's hit ratio and to provide for an increase in the scalability and throughput of a computer system. By using a partitioned cache, data blocks are dynamically assigned to a buffer in a particular buffer pool based on the reason that the corresponding data item is being accessed. This allows a different caching algorithm to be used for a particular data item not only based on the corresponding data block disk location, but also on the reason that the data item is being accessed. In addition, by employing an orthogonal search method, data blocks can be located independent of the buffer pool in which they are stored. Thus, a unified lookup mechanism can be employed for locating buffers that are maintained in different buffer pools.

Although certain aspects of the invention were described using an example database system, the present invention can be practiced on any system that manages a shared buffer cache and is therefore not limited to a particular type system.

In the foregoing specification, the invention has been described with reference to specific embodiments thereof. It will, however, be evident that various modifications and changes may be made thereto without departing from the broader spirit and scope of the invention. Accordingly, the specification and drawings are to be regarded in an illustrative rather than a restrictive sense.

What is claimed is:

1. A method for managing a buffer cache in a computer system, the method comprising the steps of:

determining that a data item should be stored in said buffer cache, wherein said buffer cache includes multiple buffer pools;

in response to determining that the data item should be stored in said buffer cache, performing the following:

selecting a particular buffer pool from among said multiple buffer pools to store said data item, wherein said selection of said particular buffer pool from among said multiple buffer pools depends on one or more criteria that are based on:

the likelihood that storing said data item in said buffer cache will cause cache hits, and differences between one or more properties of said multiple buffer pools; and storing said data item in a particular buffer contained in the particular buffer pool.

2. The method of claim 1, wherein:

the step of determining that a data item should be stored in said buffer cache is caused by receiving a request for one or more operations that require access to said data item;

said request specifies one or more parameters, wherein said one or more parameters include a particular parameter that specifies the purpose for accessing a particular object associated with said data item; and wherein said one or more criteria is based on said particular parameter.

3. The method of claim 2, wherein said request includes a database command written in a database language, wherein said database command specifies a value for said particular parameter.

4. The method of claim 3, wherein said database language substantially conforms to SQL.

5. The method of claim 1, wherein the step of selecting the particular buffer pool to store said data item comprises the step of determining said particular buffer pool based on particular information contained in said data item.

6. The method of claim 1, wherein the step of selecting the particular buffer pool to store the data item comprises the step of determining the particular buffer pool based on a user input parameter, wherein the user input parameter specifies the particular buffer pool that is to be used to store said data item.

7. The method of claim 1, wherein said one or more properties include the number of buffers in a buffer pool.

8. The method of claim 1, wherein the one or more properties include the replacement strategy associated with a buffer pool.

9. The method of claim 1, wherein the one or more criteria is based on a query plan that specifies a buffer pool used to load data to carry out said query plan.

10. The method of claim 1, wherein the step of selecting the particular buffer pool includes the step of selecting the particular buffer pool based on the logical container of the data item.

11. The method of claim 1, wherein the steps further include the step of searching, to determine whether said data item is stored in said buffer cache, hash chains associated with a hash table, wherein the hash chains provide links to all buffers contained in said multiple buffer pools.

12. The method of claim 1, wherein the steps further comprise:

after storing the data item:

selecting a second buffer pool based a hint parameter, wherein the hint parameter identifies a reason as to why the particular object associated with the data item is being accessed; and moving the data item from the particular buffer pool to the second buffer pool, wherein the second buffer pool is distinct from the particular buffer pool.

13. The method of claim 1, wherein:

the step of selecting a buffer pool further includes the step of dynamically allocating a buffer pool in said buffer cache; and the step of storing the data item includes the step of storing the data item within the dynamically allocated buffer pool.

14. The method of claim 1, where the steps further include associating multiple latches with one or more of the multiple buffer pools.

15. The method of claim 1, wherein the step of storing the data item in the particular buffer includes the step of associating a buffer pool ID with the particular buffer, wherein the buffer pool ID identifies the particular buffer pool in which the particular buffer is stored.

16. The method of claim 15, further including the steps of:

moving the particular buffer to a second buffer pool, wherein the second buffer pool is distinct from the particular buffer pool; and modifying the buffer pool ID associated with the particular buffer to reflect that the particular buffer has been moved to the second buffer pool.

17. The method of claim 15, wherein the steps further include:

the step of searching, to determine whether said data item is stored in said buffer cache, hash chains associated with a hash table, wherein the hash chains provide links to all buffers contained in said multiple buffer pools; and using the links in the hash table and the buffer pool IDs associated with particular buffers, to provide an orthogonal search method for locating a specific buffer containing a particular data block independent of the buffer pool in which the buffer is stored.

18. A computer-readable medium carrying one or more sequences of instructions for managing a buffer cache in a computer system, wherein execution of the one or more sequences of instructions by one or more processors causes the one or more processors to perform the steps of:

determining that a data item should be stored in said buffer cache, wherein said buffer cache includes multiple buffer pools;

in response to determining that the data item should be stored in said buffer cache, performing the following:

selecting a particular buffer pool from among said multiple buffer pools to store said data item, wherein said selection of said particular buffer pool from among said multiple buffer pools depends on one or more criteria that are based on:

the likelihood that storing said data item in said buffer cache will cause cache hits, and differences between one or more properties of said multiple buffer pools; and storing said data item in a particular buffer contained in the particular buffer pool.

19. The computer-readable medium of claim 18, wherein:

the step of determining that a data item should be stored in said buffer cache is caused by receiving a request for one or more operations that require access to said data item;

said request specifies one or more parameters, wherein said one or more parameters include a particular parameter that specifies the purpose for accessing a particular object associated with said data item; and wherein said one or more criteria is based on said particular parameter.

20. The computer-readable medium of claim 19, wherein said request includes a database command written in a database language, wherein said database command specifies a value for said particular parameter.

21. The computer-readable medium of claim 20, wherein said database language substantially conforms to SQL.

22. The computer-readable medium of claim 18, wherein the step of selecting the particular buffer pool to store said data item comprises the step of determining said particular buffer pool based on particular information contained in said data item.

23. The computer-readable medium of claim 18, wherein the step of selecting the particular buffer pool to store the data item comprises the step of determining the particular buffer pool based on a user input parameter, wherein the user input parameter specifies the particular buffer pool that is to be used to store said data item.

24. The computer-readable medium of claim 18, wherein said one or more properties include the number of buffers in a buffer pool.

25. The computer-readable medium of claim 18, wherein the one or more properties include the replacement strategy associated with a buffer pool.

26. The computer-readable medium of claim 18, wherein the one or more criteria is based on a query plan that specifies a buffer pool used to load data to carry out said query plan.

27. The computer-readable medium of claim 18, wherein the step of selecting the particular buffer pool includes the step of selecting the particular buffer pool based on the logical container of the data item.

28. The computer-readable medium of claim 18, wherein the steps further include the step of searching, to determine whether said data item is stored in said buffer cache, hash chains associated with a hash table, wherein the hash chains provide links to all buffers contained in said multiple buffer pools.

29. The computer-readable medium of claim 18, wherein the steps further comprise:

after storing the data item:

selecting a second buffer pool based a hint parameter, wherein the hint parameter identifies a reason as to why the particular object associated with the data item is being accessed; and moving the data item from the particular buffer pool to the second buffer pool, wherein the second buffer pool is distinct from the particular buffer pool.

30. The computer-readable medium of claim 18, wherein:

the step of selecting a buffer pool further includes the step of dynamically allocating a buffer pool in said buffer cache; and the step of storing the data item includes the step of storing the data item within the dynamically allocated buffer pool.

31. The computer-readable medium of claim 18, where the steps further include associating multiple latches with one or more of the multiple buffer pools.

32. The computer-readable medium of claim 18, wherein the step of storing the data item in the particular buffer includes the step of associating a buffer pool ID with the particular buffer, wherein the buffer pool ID identifies the particular buffer pool in which the particular buffer is stored.

33. The computer-readable medium of claim 32, wherein the steps further include:
   moving the particular buffer to a second buffer pool, wherein the second buffer pool is distinct from the particular buffer pool; and
   modifying the buffer pool ID associated with the particular buffer to reflect that the particular buffer has been moved to the second buffer pool.

34. The computer-readable medium of claim 32, wherein the steps further include:
   the step of searching, to determine whether said data item is stored in said buffer cache, hash chains associated with a hash table, wherein the hash chains provide links to all buffers contained in said multiple buffer pools; and
   using the links in the hash table and the buffer pool IDs associated with particular buffers, to provide an orthogonal search method for locating a specific buffer containing a particular data block independent of the buffer pool in which the buffer is stored.

35. A computer-readable medium carrying one or more sequences of instructions for managing a buffer cache in a computer system, wherein execution of the one or more sequences of instructions by one or more processors causes the one or more processors to perform the steps of:
   dividing the buffer cache into multiple buffer pools, wherein said multiple buffer pools include at least a first buffer pool and a second buffer pool;
   determining whether a requested data item is stored in a buffer in said buffer cache;
   if said requested data item is not stored in said buffer cache, then
      selecting said first buffer pool in said buffer cache to store said requested data item, wherein said first buffer pool is dynamically selected from among said multiple buffer pools; and
      storing said requested data item in a particular buffer currently contained in said first buffer pool;
   wherein said first buffer pool has a first buffer pool size that is based on a first number of buffers that currently reside in said first buffer pool and said second buffer pool has a second buffer pool size that is based on a second number of buffers that currently reside in said second buffer pool; and
   wherein the steps further comprise dynamically changing said first buffer pool size and said second buffer pool size by modifying links associated with said particular buffer to remove said particular buffer from said first buffer pool and to add said particular buffer to said second buffer pool.

36. The computer-readable medium of claim 35, wherein the step of storing the requested data item in the particular buffer includes the step of associating a buffer pool ID with the particular buffer, wherein the buffer pool ID identifies the particular buffer pool in which the particular buffer is stored.

37. The computer-readable medium of claim 36, wherein the step of modifying said links associated with said particular buffer further includes the step of modifying the buffer pool ID associated with the particular buffer to reflect that the particular buffer has been moved to the second buffer pool.

38. The computer-readable medium of claim 35, wherein:
   said first buffer pool uses a first replacement strategy for determining which buffers that reside in said first buffer pool are to be over written with new data items that need to be stored in said first buffer pool; and
   said second buffer pool uses a second replacement strategy for determining which buffers that reside in said second buffer pool are to be over written with new data items that need to be stored in said second buffer pool.

39. A computer system configured to manage a buffer cache in the computer system, said computer system configured to perform the steps of:
   determining that a data item should be stored in said buffer cache, wherein said buffer cache includes multiple buffer pools;
   in response to determining that the data item should be stored in said buffer cache, peforming the following:
      selecting a particular buffer pool from among said multiple buffer pools to store said data item, wherein said selection of said particular buffer pool from among said multiple buffer pools depends on one or more criteria that are based on: the likelihood that storing said data item in said buffer cache will cause cache hits, and
      differences between one or more properties of said multiple buffer pools; and
      storing said data item in a particular buffer contained in particular buffer pool.

40. The computer system of claim 39, wherein:
   the step of determining that a data item should be stored in said buffer cache is caused by receiving a request for one or more operations that require access to said data item;
   said request specifies one or more parameters, wherein said one or more parameters include a particular parameter that specifies the purpose for accessing a particular object associated with said data item; and
   wherein said one or more criteria is based on said particular parameter.

41. The computer system of claim 40, whernei said request includes a database command written in a databse language, wherein said database command specifies a value for said particular parameter.

42. The computer system of claim 41, wherein said database language substantially conforms to SQL.

43. The computer system of claim 39, wherein the step of selecting the particular buffer pool to store said data item comprises the step of determining said particular buffer pool based on particular information in said data item.

44. The computer system of claim 39, wherein the step of selecting the particular buffer pool to store the data item comprises the step of determining the particular buffer pool based on a user input parameter, wherein the user input parameter specifies the particular buffer pool that is to be used to store said data item.

45. The computer system of claim 39, wherein said one or more properties include the number of buffers in a buffer pool.

46. The computer system of claim 39, wherein the one or more properties include the replacement strategy associated with a buffer pool.

47. The computer system of claim 39, wherein the one or more criteria is based on a query plan that specifies a buffer pool used to load data to carry out said query plan.

48. The computer system of claim 39, wherein the step of selecting the particular buffer pool includes the step of selecting the particular buffer pool based on the logical container of the data item.

49. The computer system of claim 39, wherein the steps further include the step of searching, to determine whether said data item is stored in said buffer cache, hash chains associated with a hash table, wherein the hash chains provide links to all buffer contained in said multiple buffer pools.

50. The computer system of claim 39, wherein the steps further comprise:
   after storing the data item:
      selecting a second buffer pool based a hint parameter, wherein the hint parameter identifies a reason as to why the particular object associated with the data item is being accessed; and
      moving the data item from the particular buffer pool to the second buffer pool, wherien the second buffer pool is distinct from the particular buffer pool.

51. The computer system of claim 39, wherein:
   the step of selecting a buffer pool further includes the step of dynamically allocating a buffer pool in said buffer cache; and
   the step of storing the data item includes the step of storing the data item within the dynamically allocated buffer pool.

52. The computer system of claim 39, where the steps further include associating multiple latches with one or more of the multiple buffer pools.

53. The computer system of claim 39, wherein the step of storing the data item in the particular buffer includes the step of associating a buffer pool ID with the particular buffer, wherein the buffer pool ID identifies the particular buffer pool in which the particular buffer is stored.

54. The computer system of claim 53, whrein the steps further include:
   moving the particular buffer to a second buffer pool, wherein the second buffer pool is distinct from the particular buffer pool; and
   modifying the buffer pool ID associated with the particular buffer to reflect that the particular buffer has been moved to the second buffer pool.

55. The computer system of claim 53, wherein the steps further include:
   the step of searching, to determine whether said data item is stored in said buffer cache, hash chains associated with a hash table, wherein the hash chains provide links to all buffers contained in said multiple buffer pools; and
   using the links in the hash table and the buffer pool IDs associated with particular buffers, to provide an orthogonal search method for locating a specific buffer containing a particular data block independent of the buffer pool in which the buffer is stored.

56. A computer system configured to manage a buffer cache in the computer system, said computer system configured to perform the steps of:
   dividing the buffer cache into multiple buffer pools, wherein said multiple buffer pools include at least a first buffer pool and a second buffer pool;
   determining whether a requested data item is stored in a buffer in said buffer cache;
   if said requested data item is not stored in said buffer cache, then
      selecting said first buffer pool in said buffer cache to store said requested data item, wherein said first buffer pool is dynamically selected from among said multiple buffer pools; and
      storing said requested data item in a particular buffer currently contained in said first buffer pool;
      wherein said first buffer pool has a first buffer pool size that is based on a first number of buffers that currently reside in said first buffer pool and said second buffer pool has a second buffer pool size that is based on a second number of buffers that currently reside in said second buffer pool; and
      wherein the steps further comprise dynamically changing said first buffer pool size and said second buffer pool size by modifying links associated with said particular buffer to remove said particular buffer from said first buffer pool and to add said particular buffer to said second buffer pool.

57. The computer system of claim 56, wherein the step of storing the requested data item in the particular buffer includes the step of associating a buffer pool ID with the particular buffer, wherein the buffer pool ID identifies the particular buffer pool in which the particular buffer is stored.

58. The computer system of claim 57, wherein the step of modifying said links associated with said particular buffer further includes the step of modifying the buffer pool ID associated with the particular buffer to reflect that the particular buffer has been moved to the second buffer pool.

59. The computer system of claim 56, wherein:
   said first buffer pool uses a first replacement strategy for determining which buffers that reside in said first buffer pool are to be over written with new data items that need to be stored in said first buffer pool; and
   said second buffer pool uses a second replacement strategy for determining which buffers that reside in said second buffer pool are to be over written with new data items that need to be stored in said second buffer pool.

* * * * *

UNITED STATES PATENT AND TRADEMARK OFFICE
CERTIFICATE OF CORRECTION

PATENT NO. : 6,470,423 B1
DATED : October 22, 2002
INVENTOR(S) : Alexander C. Ho et al.

It is certified that error appears in the above-identified patent and that said Letters Patent is hereby corrected as shown below:

Column 16,
Line 23, replace "peforming" with -- performing --;
Line 46, replace "whernei" with -- wherein --;
Line 47, replace "databse" with -- database --.

Column 17,
Line 12, replace "buffer" with -- buffers --;
Line 22, replace "wherien" with -- wherein --;
Line 40, replace "whrein" with -- wherein --.

Signed and Sealed this

Eighteenth Day of March, 2003

JAMES E. ROGAN
*Director of the United States Patent and Trademark Office*